United States Patent [19]

Anderson et al.

[11] 4,020,783
[45] May 3, 1977

[54] AIR CLEANER WITH RESTRICTION INDICATOR

[75] Inventors: Erland D. Anderson, Eden Prairie; David S. Paulson, Elko; Bruce M. Sullivan, Burnsville, all of Minn.

[73] Assignee: Donaldson Company, Inc., Minneapolis, Minn.

[22] Filed: June 19, 1975

[21] Appl. No.: 588,291

[52] U.S. Cl. .................. 116/114 PV; 116/DIG. 25
[51] Int. Cl.² ........................................ G01L 7/08
[58] Field of Search ............. 116/114 PV, 114 AD, 116/DIG. 25, DIG. 42, 117 R; 73/406, 146.8; 210/90; 85/62

[56] References Cited

UNITED STATES PATENTS

| | | | |
|---|---|---|---|
| 2,655,894 | 10/1953 | Rabbitt | 116/117 R |
| 3,262,563 | 7/1966 | Pall | 210/90 |
| 3,270,884 | 9/1966 | Bremer | 210/90 |
| 3,283,902 | 11/1966 | Farris et al. | 210/90 |
| 3,492,968 | 2/1970 | Workman, Jr. | 116/114 PV |
| 3,780,693 | 12/1973 | Parr | 73/146.8 |

*Primary Examiner*—S. Clement Swisher
*Assistant Examiner*—Denis E. Corr
*Attorney, Agent, or Firm*—Merchant, Gould, Smith, Edell, Welter & Schmidt

[57] ABSTRACT

A device for monitoring the condition of a filter element, comprising a combined clamping nut and differential pressure indicator. The body of the device is non-circular about an axis to facilitate its use as a wing-nut, and has an outer surface and an inner surface through which passes an axial orifice, internally threaded to engage a threaded mounting rod. A differential pressure responsive device of novel design, including a slack diaphragm and an air-permeable translucent screen, is mounted in a further orifice in the outer surface for exposure of one side of the diaphragm to the pressure outside the filter, and a passage in the body connects the further aperture with the inner surface to supply to the other side of the pressure responsive device the pressure within the filter. The combination of such an arrangement with an air cleaner having a safety filter is also a part of the invention, as is the method of monitoring the filter conditions which the structure makes possible.

3 Claims, 3 Drawing Figures

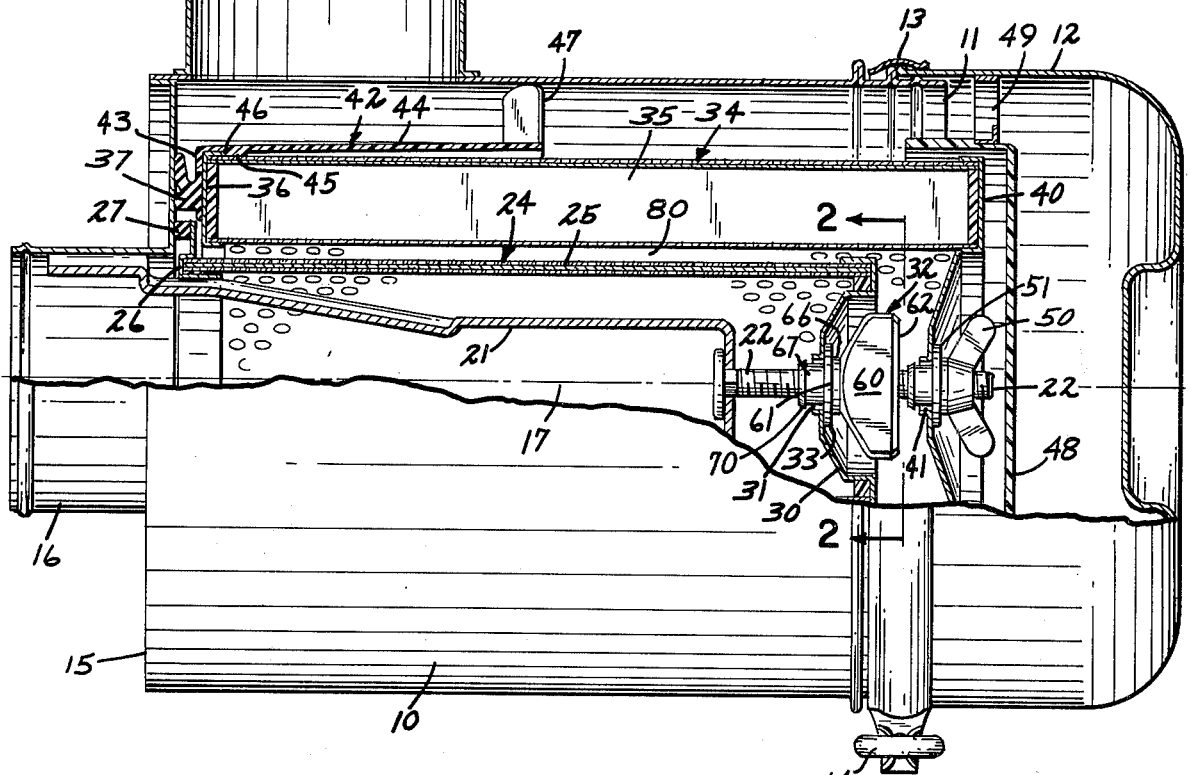
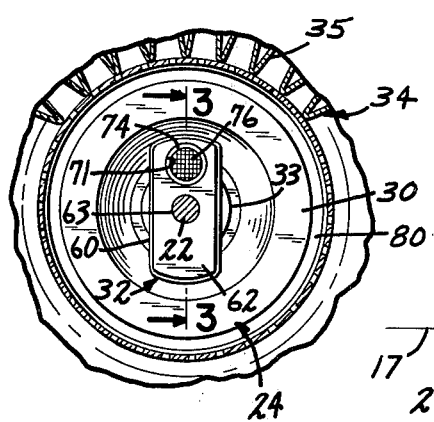
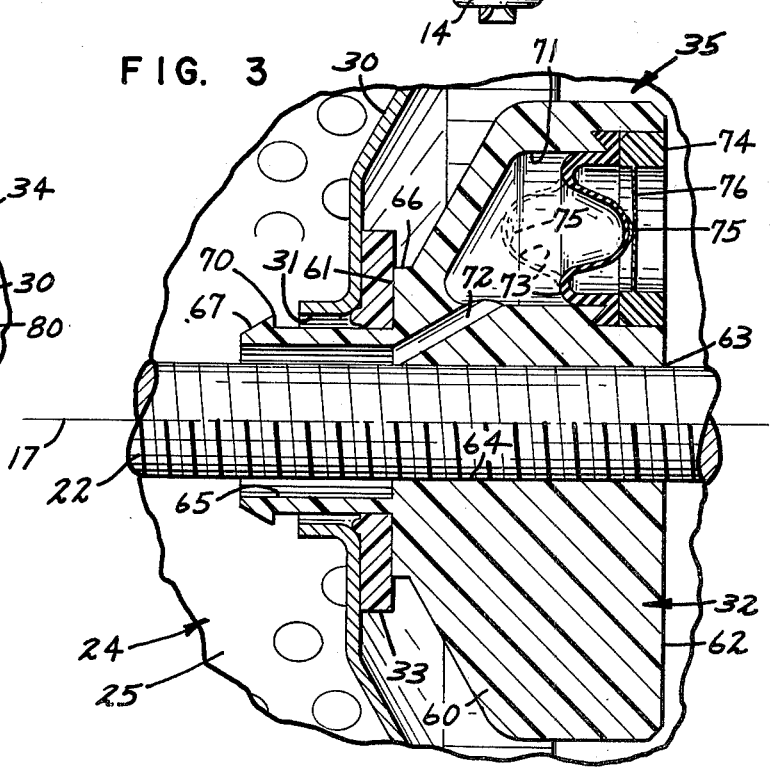

AIR CLEANER WITH RESTRICTION INDICATOR

BACKGROUND OF THE INVENTION

This invention relates to the field of air cleaners, and more particularly to such cleaners which include an outer, principal filter element enclosing an inner, "safety" filter element. In such arrangements the safety filter under ordinary conditions is functionally redundant, but it is provided to give the cleaner added reliability: in case of puncture or rupture of the principal filter, the safety filter prevents unfiltered air with its particulate contaminants from reaching the engine or other device which the cleaner is to protect until the principal filter is replaced. Some matter does, nevertheless, pass through the principal filter, particularly after an extended period of use, and is trapped by the safety filter. Principal filters are generally replaced according to some pragmatically determined schedule, or alternatively when a differential pressure indicator of some sort shows that the buildup of particulate matter in the cleaner as a whole has reached an unacceptable level. It would be possible to replace a safety filter each time a principal filter is replaced, but that expedient is not economically justifiable, and in fact reduces the overall system reliability by increasing the amount of time during which there is no protection at all at the system intake. An arbitrary schedule is usually resorted to which calls for the safety filter to be replaced, for example, at every third replacement of a principal filter. Here again, excessive caution generally causes replacement of the safety filter before this is functionally justified. No practical means has heretofore been available to determine when in fact the safety filter needs to be replaced: the known differential pressure indicators give the pressure drop across the entire air cleaner, but cannot distinguish as to how much of a pressure drop is due to a particular one of the two filters.

SUMMARY OF THE INVENTION

The present invention proposes a method for monitoring the condition of a safety filter regardless of the condition of a principal filter which it supplements, so that a technician can immediately determine by mere visual inspection, after the principal filter is removed, whether the safety filter is in condition to require replacement. It also includes a new and useful differential pressure responsive device having a normal "Operating" condition and a "Service" condition in each of which it is maintained, once achieved, by its own bias. Also novel is a construction whereby the indicator is embodied in a structure which may replace the usual mounting wingnut as far as space is concerned, as well as the combination of this construction with other elements of an air cleaner of the type described, and the monitoring method which the structure makes possible.

Various advantages and features of novelty which characterize this invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing,

FIG. 1 is a view in elevation of an air cleaner embodying the invention, parts being shown in section for the sake of clarity of illustration;

FIG. 2 is a fragmentary view along the line 2—2 of FIG. 1, showing the appearance of the structure when the safety filter is in its Service condition; and FIG. 3 is a cross sectional view along the line 3—3 of FIG. 2, to a larger scale, showing the condition of the structure when the safety filter is in its Operating condition.

DESCRIPTION OF THE PREFERRED EMBODIMENT

The invention as disclosed herein is applied to an air cleaner for the intake of an automotive vehicle engine, an air compressor, or the like. It includes a generally cylindrical housing 10 adapted to be secured to the vehicle in any convenient fashion. Housing 10 has a normally open end 11, which may be closed by an end cap 12 secured thereto by means such as a clamping strip 13 and fastener 14, a normally closed end 15 having an outlet connection 16 is centered on the longitudinal axis 17 of the cleaner, and an inlet connection 20. A bracket 21 is mounted in outlet connection 16, and supports a mounting member or shaft 22 extending axially toward the open end 11, and threaded for most of its length.

A hollow cylindrical safety filter 24 is shown to comprise a filter medium 25 supported at one end by an annular disc 26 carrying a packing or washer 27 to seal against end 15, and at the other end by a cupped disc 30 having a central opening 31 through which member 22 passes. A wingnut 32 of special construction is threaded on member 22 and may be tightened against a resilient washer 33 to secure filter 24 in housing 10.

The principal filter 34 for this air cleaner is shown in the drawing is a pleated paper medium 35 contained between perforated metal cylinders and sealed at its ends against axial air flow. At one end, filter 34 is protected by a shouldered ring 36, by which it is seated in an initial separator 42 comprising a cup 44 having an imperforate wall extending along the filter, past inlet 20, to prevent flow of air from impinging directly on the surface of the filter and cause it to move axially. The rim of the cup is provided with a plurality of outwardly directed fins 47 designed to give the air moving past them a vortical component of motion, by means of which larger particles are transported the length of the cleaner and deposited between end cap 12 and an inner cap 48 closely surrounding filter 34 and mounted in cap 12 by an annular partition having a suitable segmental opening 49. Separator 42 includes an internal rib 45 engaging the shoulder 46 of ring 36 to complete the assembly, and the bottom of cup 44 is centrally apertured to pass safety filter 24, and is provided with a packing or washer 37 to seal it to end 15 of the housing. At the other end, filter 34 is closed by a cupped disc 40 having a central opening 41 through which member 22 passes. A wingnut 50 of conventional design is threaded on member 22 and acts against a shouldered bushing 51 in aperture 41 to secure filter 34 and initial separator 42 as a unit in housing 10.

The structure of the special wingnut 32 is shown more completely in the sectional view of FIG. 3. It comprises a solid body 60 having an inner surface 61 for engaging washer 33 and an outer surface 62. The body has a central bore or orifice 63 which extends from the outer surface 62 through the inner surface 61, and which is internally threaded at 64 to engage member 22: the inner portion 65 of orifice 63 as enlarged to be greater then the outside diameter of member 22. Body 60 has a noncircular configuration transverse to axis 17 for facilitating its use as a wingnut, and is reduced in diameter at its inner end 66 to facilitate engagement with washer 33. If desired, the body may be continued as at 67 and provided with a lip 70 for captivating washer 33.

A further aperture 71 extends into body 60 from face 62, and is connected with enlarged inner portion 65 of orifice 63 by a passage 72. A slack diaphragm 73 is mounted across aperture 71, and is held in place by a ring 74. The center of diaphragm 73 includes a spot 75 of contrasting color. Ring 74 may carry or include a thin permeable translucent screen 76. Diaphragm 73 has two stable positions, in either of which it is biased by its own elasticity. In the first or normal position shown in full lines in FIG. 3, it is invaginated so that spot 75 contacts or closely approaches screen 76, so that the spot is readily visible therethrough. In the second position, the diaphragm projects inwardly into aperture 71 and spot 75 is not visible through screen 76.

In use, the cleaner inlet 20 is connected by suitable conduit means to an air intake for a vehicle engine, not shown, and outlet 16 is connected by similar ductwork to the intake manifold of the engine. Unfiltered air enters the cleaner at 20, and flows around filter 34, taking on a helical path because of vanes 47. After passing through filter medium 35 it is in the plenum 80 surrounding filter 24, from which it passes through filter medium 25 and them emerges from outlet 16. If both the filter media are clean there are minimum pressure drops across the filter elements. As element 34 traps more particulate matter, the pressure drop across medium 35 becomes greater, but that across medium 25 remains normal. By reason of passage 72 the pressure within medium 25 is applied to the left hand side of diaphragm 73 in FIG. 3, and the pressure in plenum 80 is applied to the right hand side of the diaphram. The diaphragm remains in a solid line position as shown in FIG. 3 no matter how badly element 35 becomes filled with contaminant particles.

Now when the inspection schedule demands, a technician removes cover 12 and wingnut 50, to replace medium 35, members 42–47 and 37 being removed with the filter. At this time, the technician inspects screen 76. Diaphragm 73 is in its normal position, and spot 75 is clearly visible. This is an indication that medium 25 is in proper condition to operate, a new principal filter 34 with elements 37 and 42–47 is inserted in the housing and the cap replaced.

Now consider the situation where medium 25 has been in the cleaner for some time, perhaps several replacements of filter 34 having occured. Because of slow accumulation of particulate matter passing medium 25, the medium begins to become plugged, and the pressure drop across filter element 24 begins to rise. Eventually the pressure drop is large enough to snap the diaphragm into its second, dotted position of FIG. 3, and when the next scheduled replacement of filter medium 35 is carried out, inspection of screen 76 will reveal that spot 75 is not visible. The technician now removes wingnut 32 and replaces medium 25 with a clean one. Using an appropriate syringe or his own lung power, he replaces diaphram 73 in its normal position, and reassembles the air cleaner.

Notice that the replacement interval for safety filter 24 is now no longer arbitrary, and hence hedged by a safety factor. Selection of a proper diaphram will ensure that the loss of indication occurs at any pressure differential buildup determined to be functionally realistic, and the medium 25 may remain in place for many replacement intervals of medium 35, with the sure knowledge that it is still in proper functioning condition.

Note also that if for some reason medium 35 should be ruptured or punctured, particulate matter passing through the rupture in medium 35 will accumulate on medium 25 and cause it to become plugged rapidly. Diaphram 73 will then snap into its second or Service condition to indicate that servicing of the safety filter is required. The shortening in service interval is an indication to the technician that a rupture of medium 35 has occurred. Thus, even if the technician does not notice a structural failure in the outer filter element when he removes it, its effect on the service interval of medium 25 will call for replacement of both filter elements even though the inner one may have been replaced only at the last replacement of the outer filter, and thus presumably be serviceable for some time yet.

While the special wingnut 32 has been shown as applied only for filter medium 25, it may also be used to replace wingnut 50, diaphram 73 being appropriately selected for the different pressure differential relevant in the new application.

It should be noted that if for any reason diaphram 73 should rupture, screen 76 acts as a safety filter.

Numerous objects and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. In an air cleaner having an outer casing with an outlet connection, a principal filter within said casing, a safety filter within said principal filter, said filters jointly defining a plenum, and an outlet within said principal filter, said filters being supported within said casing by means including a central externally threaded member passing through central apertures in ends of said filters to receive filter securing clamping nuts, the improvement which comprises:

a clamping nut for securing said safety filter to said member, and comprising a body of non-circular configuration about an axis and having a central orifice extending along said axis between inner and outer surfaces transverse to said axis, said orifice being internally threaded to engage said member, a further orifice in said outer surface, passage means connecting said further orifice with said inner surface, and a differential pressure indicator mounted in said further orifice to be exposed for observation when said principal filter is removed.

2. The structure of claim 1 in which said body includes a tubular extension beyond said inner surface with a lip to captivate a washer, and said passage means terminates within said extension, the inside diameter of said extension being greater than the diameter of said threaded member.

3. In an air cleaner, in combination:
- a housing having a longitudinal axis, a first generally closed end having an axial outlet connection, a generally open end closable by removable cap, and a peripheral inlet connection;
- a hollow principal filter element within said housing having an open end, adapted for sealing engagement internally with said closed end of said housing, and a substantially closed end with a central aperture;
- a shorter, hollow safety filter element within said principal filter element, having an open end adapted for sealing engagement with said closed end of said housing and a substantially closed end with a central aperture;
- a mounting bracket secured to said housing within said filter elements, and having an externally threaded member extending axially toward said removable cap to pass through said central apertures in said filters;
- a first clamping nut for cooperation with said member to hold said principal filter in position within said housing;
- a second clamping nut for cooperation with said member to hold said safety filter in position within said housing and said principal filter, including a solid body which is non-circular around a central axis and has an axial central orifice extending therethrough from an inner surface to an outer surface, and internally threaded to receive said threaded member, said body further having a further orifice extending inwardly from said outer surface, and a passage connecting said further orifice with said inner surface of said body;
- and differential pressure responsive means mounted in said further opening for response to a predetermined difference between the pressure within and without said safety filter.

* * * * *